US012046182B2

(12) United States Patent
Yang et al.

(10) Patent No.: US 12,046,182 B2
(45) Date of Patent: Jul. 23, 2024

(54) COMPENSATION CONTROL METHOD AND DISPLAY DEVICE

(71) Applicant: BOE Technology Group Co., Ltd., Beijing (CN)

(72) Inventors: Fei Yang, Beijing (CN); Tangxiang Wang, Beijing (CN); Xiaolong Wei, Beijing (CN); Jingbo Xu, Beijing (CN); Jianbo Xian, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/913,782

(22) PCT Filed: Nov. 15, 2021

(86) PCT No.: PCT/CN2021/130566
§ 371 (c)(1),
(2) Date: Sep. 22, 2022

(87) PCT Pub. No.: WO2022/227500
PCT Pub. Date: Nov. 3, 2022

(65) Prior Publication Data
US 2024/0212568 A1 Jun. 27, 2024

(30) Foreign Application Priority Data
Apr. 28, 2021 (CN) ......................... 202110467467.7

(51) Int. Cl.
*G09G 5/18* (2006.01)
*G09G 3/20* (2006.01)
*G09G 3/3225* (2016.01)

(52) U.S. Cl.
CPC ......... *G09G 3/2096* (2013.01); *G09G 3/3225* (2013.01); *G09G 2300/0842* (2013.01);
(Continued)

(58) Field of Classification Search
CPC ............... G09G 3/2096; G09G 3/3225; G09G 2300/0842; G09G 2310/08;
(Continued)

(56) References Cited

U.S. PATENT DOCUMENTS

2010/0188320 A1 7/2010 Min et al.
2010/0188390 A1 7/2010 Min et al.
(Continued)

FOREIGN PATENT DOCUMENTS

CN 103903561 A 7/2014
CN 104751788 A 7/2015
(Continued)

OTHER PUBLICATIONS

CN 202110467467.7 first office action.
PCT/CN2021/130566 international search report and written opinion.

*Primary Examiner* — Abbas I Abdulselam
(74) *Attorney, Agent, or Firm* — IPro, PLLC

(57) ABSTRACT

The present disclosure provides a compensation control method and a display device. The method includes in a standstill phase, controlling the display panel to stand still; after the standstill phase ends, sensing, by the timing controller, characteristic values of each row of the pixel circuits in the display panel in a time division manner by controlling the gate driver and the source driver; setting a black insertion time period between time periods for sensing characteristic values of different rows of pixel circuits, during the black insertion time period, controlling, by the timing controller, the gate driver and the source driver, to display a black picture on the display panel.

20 Claims, 6 Drawing Sheets

(52) U.S. Cl.
CPC ... *G09G 2310/08* (2013.01); *G09G 2320/041* (2013.01); *G09G 2330/026* (2013.01); *G09G 2330/027* (2013.01)

(58) Field of Classification Search
CPC ....... G09G 2320/041; G09G 2330/026; G09G 2330/027
See application file for complete search history.

(56) References Cited

U.S. PATENT DOCUMENTS

| | | | | |
|---|---|---|---|---|
| 2012/0056856 | A1* | 3/2012 | Woo | G09G 3/3648 345/204 |
| 2014/0176516 | A1 | 6/2014 | Kim et al. | |
| 2015/0187268 | A1 | 7/2015 | Tani et al. | |
| 2016/0012800 | A1 | 1/2016 | Han et al. | |
| 2016/0140902 | A1 | 5/2016 | Yang | |
| 2017/0004765 | A1 | 1/2017 | Tani et al. | |
| 2019/0189038 | A1 | 6/2019 | Park | |
| 2020/0160781 | A1 | 5/2020 | Park | |
| 2020/0327855 | A1 | 10/2020 | Lin et al. | |
| 2021/0335253 | A1 | 10/2021 | Yang et al. | |
| 2021/0335278 | A1 | 10/2021 | Song et al. | |

FOREIGN PATENT DOCUMENTS

| | | | |
|---|---|---|---|
| CN | 105243985 | A | 1/2016 |
| CN | 106328052 | A | 1/2017 |
| CN | 108399891 | A | 8/2018 |
| CN | 108877650 | A | 11/2018 |
| CN | 109036291 | A | 12/2018 |
| CN | 109697944 | A | 4/2019 |
| CN | 109949748 | A | 6/2019 |
| CN | 111199708 | A | 5/2020 |
| CN | 113192451 | A | 7/2021 |

* cited by examiner

COMPENSATION CONTROL METHOD AND DISPLAY DEVICE

CROSS-REFERENCE TO RELATED APPLICATION

This application is the U.S. national phase of PCT Application No. PCT/CN2021/130566 filed on Nov. 15, 2021, which claims a priority of the Chinese patent application No. 202110467467.7 filed on Apr. 28, 2021, which is incorporated herein by reference in its entirety.

TECHNICAL FIELD

The present disclosure relates to the field of display technology, in particular to a compensation control method and a display device.

BACKGROUND

The existing display device cannot accurately sense the characteristic value of the pixel circuit in the display panel when the display device is turned off, so that the data voltage cannot be accurately compensated when the display device is turned on again, thereby affecting the quality of the display image.

SUMMARY

In one aspect, the present disclosure provides in some embodiments a compensation control method, applied to a display device, wherein the display device includes a display panel, a gate driver, a source driver and a timing controller, the display panel includes a plurality of pixel circuits, and the compensation control method includes: after the timing controller detects a power-off sensing instruction, in a standstill phase, controlling the display panel to stand still; after the standstill phase ends, sensing, by the timing controller, characteristic values of each row of the pixel circuits in the display panel in a time division manner by controlling the gate driver and the source driver; setting a black insertion time period between time periods for sensing characteristic values of different rows of pixel circuits, during the black insertion time period, controlling, by the timing controller, the gate driver and the source driver, to display a black picture on the display panel.

Optionally, the pixel circuit comprises a driving transistor; the standstill phase includes a driving standstill phase; after the timing controller detects the power-off sensing instruction, a power-off sensing time period includes the driving standstill phase and a driving sensing phase set in sequence; the driving sensing phase includes N driving sensing time periods set in sequence, and a driving black insertion time period is set between two adjacent driving sensing time periods; N is a number of rows of pixel circuits included in the display panel; n and N are positive integers, and n is less than or equal to N; the compensation control method includes a first power-off sensing step; the first power-off sensing step includes: in the driving standstill phase, controlling the display panel to stand still; in the nth driving sensing time period, sensing, by the timing controller, characteristic values of driving transistors in the nth row of pixel circuits by controlling the gate driver and the source driver; in the driving black insertion time period, controlling, by the timing controller, the gate driver and the source driver to display the black picture on the display panel.

Optionally, the pixel circuit comprises a light emitting element; the standstill phase further comprises a light emitting standstill phase; the power-off sensing time period further includes a light emitting standstill phase and a light emitting sensing phase sequentially arranged after the driving sensing phase; the light emitting sensing phase includes N light emitting sensing time periods sequentially arranged, a light emitting black insertion time period is set between two adjacent light emitting sensing time periods; the compensation control method further includes a second power-off sensing step; the second power-off sensing step includes: in the light emitting standstill phase, controlling the display panel to stand still; in the nth light emitting sensing period, sensing, by the timing controller, characteristic values of light emitting elements in the nth row of pixel circuits by controlling the gate driver and the source driver; in the light emitting black insertion time period, controlling, by the timing controller, the gate driver and the source driver to display the black picture on the display panel.

Optionally, the compensation control method further includes a power-on compensation step; wherein the power-on compensation step includes: when the display device is powered on next time, compensating, by the timing controller, data voltages provided to each row of pixel circuits according to the characteristic values of the driving transistors in each row of pixel circuits sensed in each driving sensing time period, and the characteristic values of the light emitting elements in each row of pixel circuits sensed in the light emitting sensing time period.

Optionally, the step of controlling the display panel to stand still includes: controlling, by the timing controller, the gate driver and the source driver to display the black picture on the display panel; or, controlling, by the power supply module included in the display device, the display panel to be powered off.

Optionally, a time period during which the display panel displays an image includes at least one display sensing phase, and the compensation control method further includes: in the display sensing phase, sensing, by the timing controller, the characteristic value of the pixel circuit by controlling the gate driver and the source driver and compensating the data voltage supplied to the pixel circuit according to the characteristic value; setting an interval time period between adjacent display sensing phases; and/or, the compensation control method further includes: before the display panel displays an image, detecting an initial temperature of the display panel; and detecting a real-time temperature of the display panel when the display panel displays an image, when an absolute value of a difference between the real-time temperature and the initial temperature is greater than a temperature difference threshold, sensing, by the timing controller, the characteristic value of the pixel circuit by controlling the gate driver and the source driver, and compensating the data voltage provided to the pixel circuit according to the characteristic value; the temperature difference threshold is a positive value.

Optionally, the pixel circuit comprises a driving transistor and a light emitting element; the characteristic value of the pixel circuit includes a characteristic value of the driving transistor and a characteristic value of the light emitting element; the step of sensing, by the timing controller, the characteristic value of the pixel circuit by controlling the gate driver and the source driver includes: sensing, by the timing controller, the characteristic value of the driving transistor in the pixel circuit by controlling the gate driver and the source driver; after sensing the characteristic value of the driving transistor, sensing, by the timing controller, the characteristic value of the light emitting element in the pixel circuit by controlling the gate driver and the source driver.

In a second aspect, an embodiment of the present disclosure provides a display device including a display panel, a gate driver, a source driver and a timing controller, wherein the display panel includes a plurality of rows and a plurality of columns of pixel circuits; the timing controller is respectively electrically connected to the gate driver and the source driver; the display panel is configured to be controlled to maintain a standstill state in a standstill phase after the timing controller receives and detects a power-off sensing instruction; the timing controller is configured to sense characteristic values of each row of pixel circuits included in the display panel in a time division manner by controlling the gate driver and the source driver after the standstill phase ends, and control the gate driver and the source driver to display a black picture on the display panel in a black insertion time period set between time periods for sensing characteristic values of different rows of the pixel circuits.

Optionally, the standstill phase includes a driving standstill phase; after the timing controller detects the power-off sensing instruction, a power-off sensing time period includes a driving standstill phase and a driving sensing phase that are set in sequence; the driving sensing phase includes N driving sensing time periods set in sequence, and a driving black insertion time period is set between two adjacent driving sensing time periods; N is a number of rows of pixel circuits included in the display panel; n and N are positive integers, and n is less than or equal to N; the display panel is configured to be stand still in the driving standstill phase; the timing controller is further configured to sense characteristic values of driving transistors in an nth row of pixel circuits by controlling the gate driver and the source driver in an nth driving sensing time period, and also control the gate driver and the source driver to display the black picture on the display panel in the driving black insertion time period.

Optionally, the standstill phase includes a light emitting standstill phase; the power-off sensing time period further includes a light emitting standstill phase and a light emitting sensing phase sequentially arranged after the driving sensing phase; the light emitting sensing phase includes N light emitting sensing time periods set in sequence, and a light emitting black insertion time period is set between two adjacent light emitting sensing time periods; the display panel is configured to be stand still in the light emitting standstill phase; the timing controller is further configured to sense characteristic values of light emitting elements in the nth row of pixel circuits by controlling the gate driver and the source driver in an nth light emitting sensing time period, control the gate driver and the source driver to display the black picture on the display panel in the light emitting black insertion time period.

Optionally, the timing controller is further configured to, when the display device is turned on next time, compensate data voltages provided to each row of pixel circuits according to the characteristic values of the driving transistors in each row of pixel circuits sensed in each driving sensing time period, and, the characteristic values of the light emitting elements in each row of pixel circuits sensed in the light emitting sensing time period.

Optionally, the timing controller is configured to control the gate driver and the source driver to display the black picture on the display panel in the driving standstill phase and the light emitting standstill phase; or, the display device further includes a power supply module, the power supply module is configured to stop supplying power to the display panel in the driving standstill phase and the light emitting standstill phase, and resume supplying power to the display panel after the driving standstill phase ends and the light emitting standstill phase ends.

Optionally, a time period during which the display panel displays an image includes at least one display sensing phase, and the timing controller is further configured to sense the characteristic value of the pixel circuit by controlling the gate driver and the source driver in the display sensing phase, and compensate the data voltage supplied to the pixel circuit according to the characteristic value; an interval period is set between adjacent display sensing phases; and/or, the timing controller is further configured to, when the display panel displays an image, and, when an absolute value of a difference between a real-time temperature of the display panel and an initial temperature of the display panel is greater than a temperature difference threshold, sense the characteristic value of the pixel circuit by controlling the gate driver and the source driver, and compensate the data voltage provided to the pixel circuit according to the characteristic value; the temperature difference threshold is a positive value; the initial temperature of the display panel is a temperature of the display panel before the display panel displays an image.

Optionally, the display device further comprises a data memory for storing the characteristic value of the pixel circuit.

Optionally, the display device further includes a sensor; wherein the sensor is configured to detect the initial temperature of the display panel before the display panel displays an image, and detect the real-time temperature of the display panel when the display panel displays an image.

Optionally, the display panel further includes first scan control lines of a plurality of rows, second scan control lines of a plurality of rows, data lines of a plurality of columns, and sensing lines of a plurality of columns; one row of pixel circuits are respectively electrically connected to a first scan control line of a corresponding row and a second scan control line of the corresponding row, and one column of pixel circuits are electrically connected to a data line of a corresponding column and a sensing line of the corresponding column respectively; the gate driver is electrically connected to the first scan control lines of the plurality of rows and the second scan control lines of the plurality of rows, and is configured to provide a corresponding first scan control signal for the first scan control line of each row, and provide a corresponding second scan control signal for the second scan control line of each row; the source driver is electrically connected to data lines of the plurality of columns and the sensing lines the plurality of columns, respectively, is configured to provide a data voltage to the data lines of each column, and receive a sensing voltage from the sensing line of each column.

Optionally, the pixel circuit includes a driving circuit, a light emitting element, a data writing-in circuit, an external compensation switch circuit and an energy storage circuit; the data writing-in circuit is electrically connected to the first scan control line of the corresponding row, the data line of the corresponding column and the driving circuit, and is configured to control to connect or disconnect the data line and a control terminal of the driving circuit under the control of the first scan control signal provided by the first scan control line of the corresponding row; the external compensation switch circuit is electrically connected to the second scan control line of the corresponding row, a first terminal of the driving circuit and the sensing line of the corresponding column, respectively, and is configured to control to connect or disconnect the first terminal of the driving circuit and the sensing line of the corresponding column under the control of the second scan control signal provided by the second scan control line of the corresponding row; the first terminal of the driving circuit is electrically connected to the light emitting element; the second terminal of the driving circuit is electrically connected to a power supply voltage terminal, and the driving circuit is configured to generate a driving current for driving the light emitting element under the control of a potential of the control terminal of the driving circuit; a first terminal of the energy storage circuit is electrically connected to the control terminal of the driving circuit, a second terminal of the energy storage circuit is electrically connected to the first terminal of the driving circuit, and the energy storage circuit is used for storing electrical energy.

DETAILED DESCRIPTION

Figure 1:
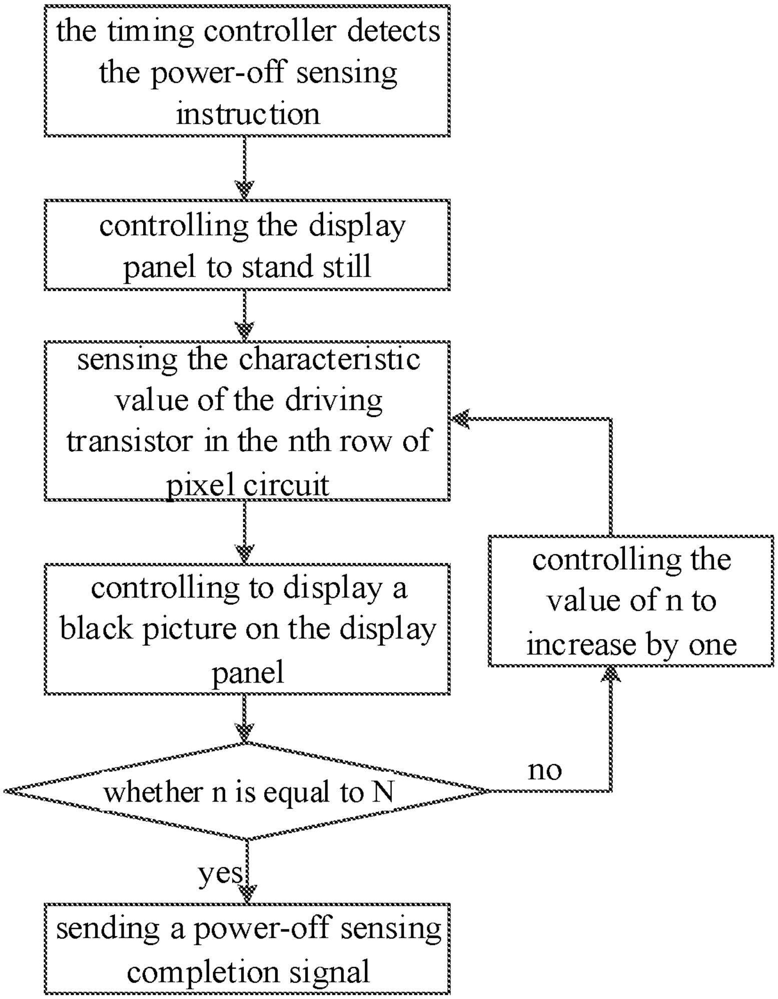
FIG. 1 is a flowchart of a power-off sensing method in a compensation control method according to at least one embodiment of the present disclosure.

The technical solutions in the embodiments of the present disclosure will be clearly and completely described below with reference to the accompanying drawings in the embodiments of the present disclosure. Obviously, the described embodiments are only a part of the embodiments of the present disclosure, but not all of the embodiments. Based on the embodiments in the present disclosure, all other embodiments obtained by those of ordinary skill in the art without creative work shall fall within the protection scope of the present disclosure.

The compensation control method described in the embodiment of the present disclosure is applied to a display device, the display device includes a display panel, a gate driver, a source driver and a timing controller, the display panel includes a plurality of pixel circuits, and the compensation control method includes: after the timing controller detects a power-off sensing instruction, In a standstill phase, controlling the display panel to stand still;

After the standstill phase ends, controlling, by the timing controller, the gate driver and the source driver to sense characteristic values of each row of the pixel circuits in the display panel in a time division manner;

Setting a black insertion time period between the time periods for sensing the characteristic values of the different rows of pixel circuits, during the black insertion time period, controlling, by the timing controller, the gate driver and the source driver, to display a black picture on the display panel.

After the timing controller detects the power-off sensing instruction, controlling the display panel to stand still in the standstill phase to ensure that a temperature of the display panel is lowered without affecting a sensing result of the characteristic values of the pixel circuit;

After the standstill phase ends, controlling, by the timing controller, to sense the characteristic values of each row of the pixel circuits in the display panel in a time division manner;

During the black insertion time period set between the time periods for sensing the characteristic values of different rows of the pixel circuits, controlling to display a black picture on the display panel, so as to ensure that there is no residual charge inside the display panel, and the next sensing is not affected. The phenomenon of inaccurate sensing of the characteristic value of the pixel circuit is avoided, and the quality of the display image can be improved.

During specific implementation, the duration of the standstill phase may be selected according to actual conditions.

In at least one embodiment of the present disclosure, the power-off sensing instruction may be an instruction instructing the display device to power-off.

In the compensation control method described in the embodiment of the present disclosure, after the timing controller detects the power-off sensing instruction, the characteristic value of each row of pixel circuits included in the display panel can be accurately sensed, so that when the display panel is turned on next time, The data voltages provided to the each row of pixel circuits can be compensated according to the sensed characteristic values, so as to improve the quality of the display image.

Optionally, the pixel circuit may include a driving transistor and a light emitting element, and the characteristic value of the pixel circuit may include a characteristic value of the driving transistor and a characteristic value of the light emitting element.

The characteristic value of the driving transistor may include: a threshold voltage of the driving transistor, and a mobility of the driving transistor;

The characteristic value of the light emitting element may include: a turn-on voltage of the light emitting element.

In the compensation control method described in at least one embodiment of the present disclosure, the standstill phase may include a driving standstill phase; after the timing controller detects the power-off sensing instruction, the power-off sensing period includes the driving standstill phase and a driving sensing stage set in sequence; the driving sensing phase includes N driving sensing time periods set in sequence, and a driving black insertion time period is set between two adjacent driving sensing time periods; N is the number of rows of pixel circuits included in the display panel; n and N are positive integers, and n is less than or equal to N; the compensation control method includes a first power-off sensing step;

The first power-off sensing step includes:

In the driving standstill phase, controlling the display panel to stand still;

During the nth drive sensing time period, controlling, by the timing controller, the gate driver and the source driver to sense characteristic values of driving transistors in the nth row of pixel circuits;

During the driving black insertion time period, controlling, by the timing controller, the gate driver and the source driver to display a black picture on the display panel.

In at least one embodiment of the present disclosure, after detecting the power-off sensing instruction of the display device, the characteristic values of the driving transistors in each row of pixel circuits included in the display panel can be sensed, so that when the display device is turned on next time, the timing controller can compensate the data voltage provided to each row of pixel circuits according to the characteristic value, so as to improve the quality of the display image.

In a specific implementation, when performing power-off sensing, the display panel may be controlled to stand still in the driving standstill phase, so as to ensure that the temperature of the display panel can be lowered without affecting the sensing result of the driving transistor; the duration of the driving standstill phase can be about 60 s (seconds), but not limited to this;

After that, in the first driving sensing time period, the timing controller senses the characteristic values of the driving transistors in the first row of pixel circuits;

After the sensing is completed for the first row of pixel circuits, the driving black insertion time period is entered, and the timing controller controls to display the black image on the display panel to ensure that there is no residual charge inside the display panel and the next sensing is not affected;

After that, the characteristic values of the driving transistors in each row of pixel circuits are sensed in sequence, and black insertion is performed after each sensing until the last row of pixel circuits is detected.

As shown in FIG. 1, when only the characteristic value of the driving transistor is sensed when the display device is turned off, the steps of sensing the characteristic value of the driving transistor in the pixel circuit when the display device is turned off may be as follows:

After the timing controller detects the power-off sensing instruction, it first controls the display panel to stand still, and then senses the characteristic value of the driving transistor in the nth row of pixel circuit (the initial value of n is 1), and controls to display a black picture on the display panel, then determines whether n is equal to N (N is the total number of rows of pixel circuits included in the display panel), if yes, sends a power-off sensing completion signal, otherwise controls the value of n to increase by one, and goes to the step of sensing the characteristic values of driving transistors in nth row of pixel circuits.

Optionally, the step of controlling the display panel to stand still in the driving standstill phase includes:

In the driving standstill phase, controlling, by the timing controller, the gate driver and the source driver to display a black picture on the display panel; or, The display device further includes a power supply module; the step of controlling the display panel to stand still in the driving standstill phase includes: in the driving standstill phase, controlling, by the power supply module, the display panel to be powered off; and, the compensation control method further includes: after the driving standstill phase ends, resuming, by the power supply module, supplying power to the display panel.

In at least one embodiment of the present disclosure, the controlling the display panel to stand still refers to: displaying a black picture on the display panel; or, the display panel is powered off and stand still.

In at least one embodiment of the present disclosure, the power-off sensing time period further includes a light emitting standstill phase and a light emitting sensing phase sequentially arranged after the driving sensing phase; the light emitting sensing phase includes N light emitting sensing time periods sequentially arranged, a light emitting black insertion time period is set between two adjacent light emitting sensing time periods; the compensation control method further includes a second power-off sensing step;

The second power-off sensing step includes:

In the light emitting standstill phase, controlling the display panel to stand still;

In the nth light emitting sensing period, controlling, by the timing controller, the gate driver and the source driver to sense the characteristic value of the light emitting element in the nth row of pixel circuits;

In the light emitting black insertion period, controlling, by the timing controller, the gate driver and the source driver to display a black picture on the display panel.

In a specific implementation, during power-off sensing, after detecting the characteristic value of the driving transistor in the pixel circuit, in the light emitting standstill phase, the display panel is controlled to ensure that the characteristics of the light emitting element in the pixel circuit can be stabilized, to ensure the accuracy of the characteristic value sensing of the light emitting element; the duration of the light emitting standstill phase can be several minutes to several tens of minutes;

After that, in the first light emitting sensing time period, detecting, by the timing controller, the characteristic values of the light emitting elements in the first row of pixel circuits;

During the light emitting black insertion time period after the first light emitting sensing time period, the timing controller controls to display a black picture on the display panel to ensure that there is no residual charge inside the display panel and the next sensing is not affected;

After that, the characteristic values of the light emitting elements in each row of pixel circuits are sensed in sequence, and black insertion is performed after each sensing, until the last row of pixel circuits is detected.

Figure 2:
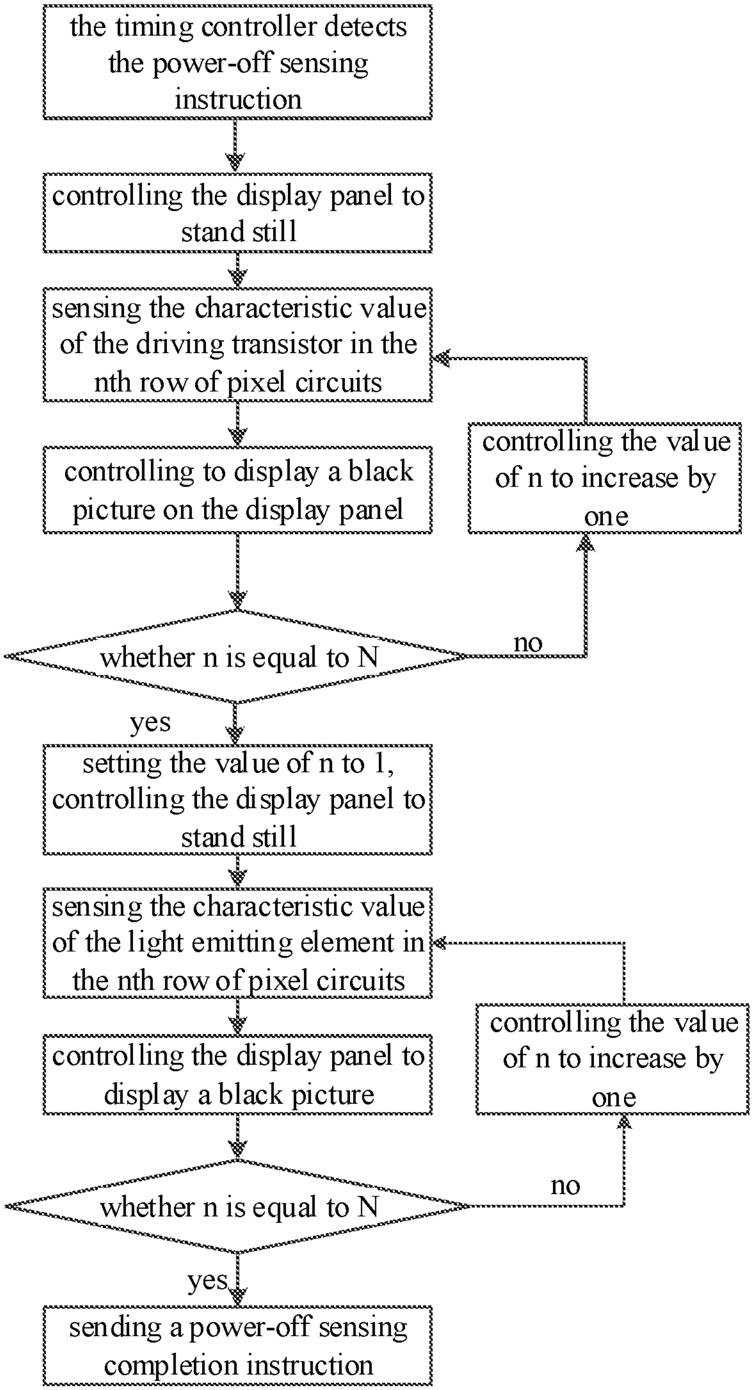
FIG. 2 is a flowchart of a power-off sensing method in a compensation control method according to at least one embodiment of the present disclosure.

As shown in FIG. 2, when the display device is turned off, when the characteristic value of the driving transistor and the characteristic value of the light emitting element need to be sensed, After the timing controller detects the power-off sensing instruction, it first controls the display panel to stand still, and then senses the characteristic value of the driving transistor in the nth row of pixel circuits (the initial value of n is 1), and controls to display a black picture on the display panel, then determines whether n is equal to N (N is the total number of rows of pixel circuits included in the display panel), if n is not equal to N, controls the value of n to increase by one, and goes to the step of sensing the characteristic value of the driving transistors in the nth row of pixel circuits, if n is equal to N then set the value of n to 1 and go to the next step;

Controlling the display panel to stand still, then sensing the characteristic value of the light emitting element in the nth row of pixel circuits, controlling the display panel to display a black picture, and then determining whether n is equal to N, if n is not equal to N, controlling the value of n to increase by one, going to the step of sensing the characteristic value of the light emitting element in the nth row of pixel circuits, and if n is equal to N, sending a power-off sensing completion instruction.

Optionally, the step of controlling the display panel to stand still in the light emitting standstill phase includes: in the light emitting standstill phase, controlling, by the timing controller, the gate driver and the source driver to display a black picture on the display panel; or, The display device further includes a power supply module; the step of controlling the display panel to stand still in the light emitting standstill phase includes: in the light emitting standstill phase, controlling, by the power supply module, the display panel to be powered off; and, the compensation control method further includes: after the light emitting standstill phase ends, resuming, by the power supply module, to supply power to the display panel.

In at least one embodiment of the present disclosure, the compensation control method further includes a power-on compensation step;

The power-on compensation step includes: when the display device is powered on next time, compensating, by the timing controller, the data voltages provided to each row of pixel circuits according to the characteristic values of the driving transistors in each row of pixel circuits sensed in each driving sensing time period, and the characteristic values of the light emitting elements in each row of pixel circuits sensed in the light emitting sensing time period, so as to improve the display quality when the display device is turned on next time.

Optionally, the time period during which the display panel displays a picture may include at least one display sensing phase, and the compensation control method according to at least one embodiment of the present disclosure may further include: in the display sensing phase, controlling, by the timing controller, the gate driver and the source driver to sense the characteristic value of the pixel circuit, and compensates the data voltage supplied to the pixel circuit according to the characteristic value; setting an interval time period between adjacent display sensing phases; and/or, The compensation control method according to at least one embodiment of the present disclosure may further include: before the display panel displays an image, detecting an initial temperature of the display panel; and detecting a real-time temperature of the display panel when the display panel displays an image, when the absolute value of the difference between the real-time temperature and the initial temperature is greater than a temperature difference threshold, controlling, by the timing controller, the gate driver and the source driver to sense the characteristic value of the pixel circuit, and compensating the data voltage provided to the pixel circuit according to the characteristic value;

The temperature difference threshold is a positive value.

In the compensation control method described in at least one embodiment of the present disclosure, when the display panel displays a picture, when the characteristics of the driving transistor in the pixel circuit and the characteristics of the light emitting element in the pixel circuit are stable, it may not require to perform real-time sensing. However, when the normal display time of the display panel reaches the interval time t1 (the duration of the interval time period can be the interval time t1), the characteristic value of the pixel circuit can be measured once in the display sensing phase, that is, when the display panel displays an image, the timing controller controls the gate driver and the source driver to sense the characteristic value of the pixel circuit every interval time t1, the data voltage supplied to the pixel circuit is compensated according to the characteristic value, so that power consumption can be reduced.

In a display device, the temperature has a direct impact on the characteristics of the driving transistors and light emitting elements in the pixel circuit. Therefore, when sensing the characteristic value of the pixel circuit, the temperature factor needs to be considered. Based on this, in the compensation control method described in at least one embodiment of the present disclosure, before the display panel starts to display the image normally, the initial temperature of the display panel is detected first, and then when the display panel displays the image, the temperature of the display panel is detected in real time, when the absolute value of the difference between the real-time temperature and the initial temperature is greater than the temperature difference threshold, the timing controller controls the gate driver and the source driver to sense the characteristic value of the pixel circuit, and the data voltage provided to the pixel circuit is compensated according to the characteristic value, so as to improve the influence of the temperature of the display panel on the display and improve the quality of the display image.

Optionally, the temperature difference threshold may be, for example, 10 degrees Celsius or 20 degrees Celsius, but not limited thereto, and the temperature difference threshold may be selected according to actual conditions.

For example, when the temperature difference threshold is 20 degrees Celsius and the initial temperature of the display panel is 5 degrees Celsius, the characteristic value of the pixel circuit is sensed when the real-time temperature of the display panel is greater than 25 degrees Celsius or less than −15 degrees Celsius.

In at least one embodiment of the present disclosure, the display device may be an Organic Light Emitting Diode (OLED) display device, but not limited thereto.

In an OLED display device, temperature has a direct impact on the characteristics of the driving transistor and the characteristics of the OLED light emitting element; for example, when the temperature is high, the mobility of the driving transistor will increase, and when the temperature is low, the mobility of the driving transistor will become low.

Optionally, the pixel circuit includes a driving transistor and a light emitting element;

The characteristic value of the pixel circuit includes the characteristic value of the driving transistor and the characteristic value of the light emitting element;

The characteristic value of the driving transistor may include: a threshold voltage of the driving transistor, and a mobility of the driving transistor;

The characteristic value of the light emitting element may include: a turn-on voltage of the light emitting element.

In at least one embodiment of the present disclosure, the step of controlling, by the timing controller, the gate driver and the source driver to sense the characteristic value of the pixel circuit may include:

Controlling, by the timing controller, the gate driver and the source driver to senses the characteristic value of the driving transistor in the pixel circuit;

After sensing the characteristic value of the driving transistor, controlling, by the timing controller, the gate driver and the source driver to sense the characteristic value of the light emitting element in the pixel circuit.

In specific implementation, the characteristic value of the driving transistor can be sensed first to ensure the same current flowing through the light emitting element, and then the characteristic value of the light emitting element is sensed to ensure the accuracy of sensing the characteristic value of the light emitting element.

Figure 3:
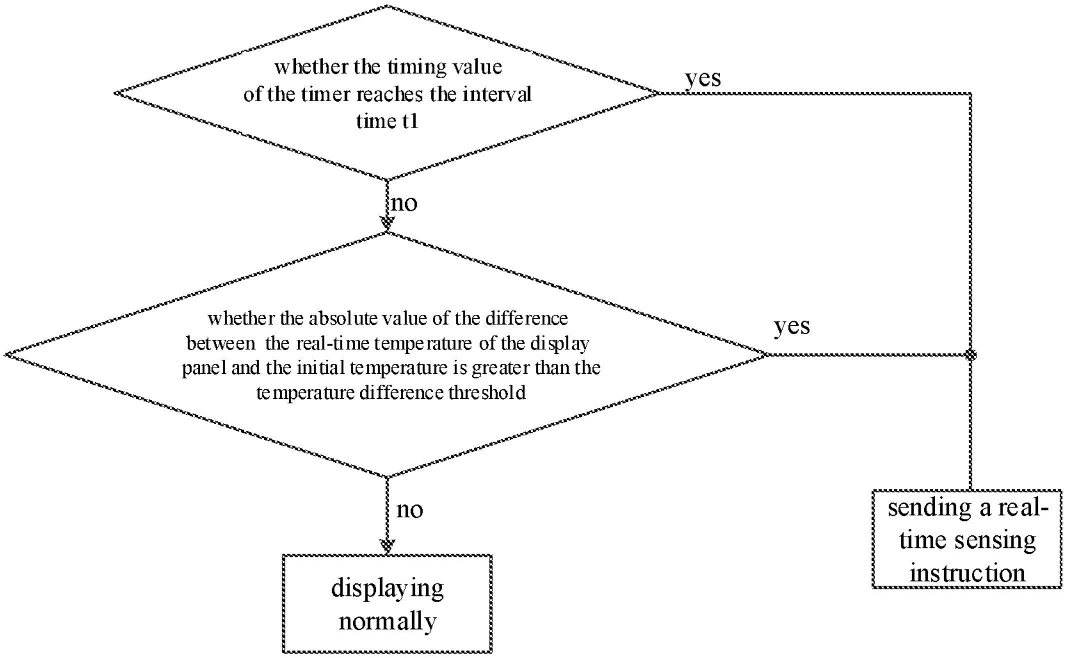
FIG. 3 is a flowchart of a power-on sensing method in a compensation control method according to at least one embodiment of the present disclosure.

As shown in FIG. 3, the timer can be used for counting after the display panel normally displays an image. When the timing value of the timer reaches the interval time t1, the counting value is cleared to zero, and then the counting is restarted. When the interval time t1 is reached, the main board of the display device sends a real-time sensing instruction to the timing controller, and the timing controller senses the characteristic value of the pixel circuit by controlling the gate driver and the source driver;

When the timing value does not reach the interval time t1, it is determined whether the absolute value of the difference between the real-time temperature of the display panel and the initial temperature is greater than the temperature difference threshold, and when the absolute value of the difference is greater than the temperature difference threshold, the main board of the display device sends a real-time sensing instruction to the timing controller, and the timing controller senses the characteristic value of the pixel circuit by controlling the gate driver and the source driver, otherwise the display panel displays normally.

In at least one embodiment of the present disclosure, the interval time t1 may be 4 hours, but not limited thereto.

Figure 4:
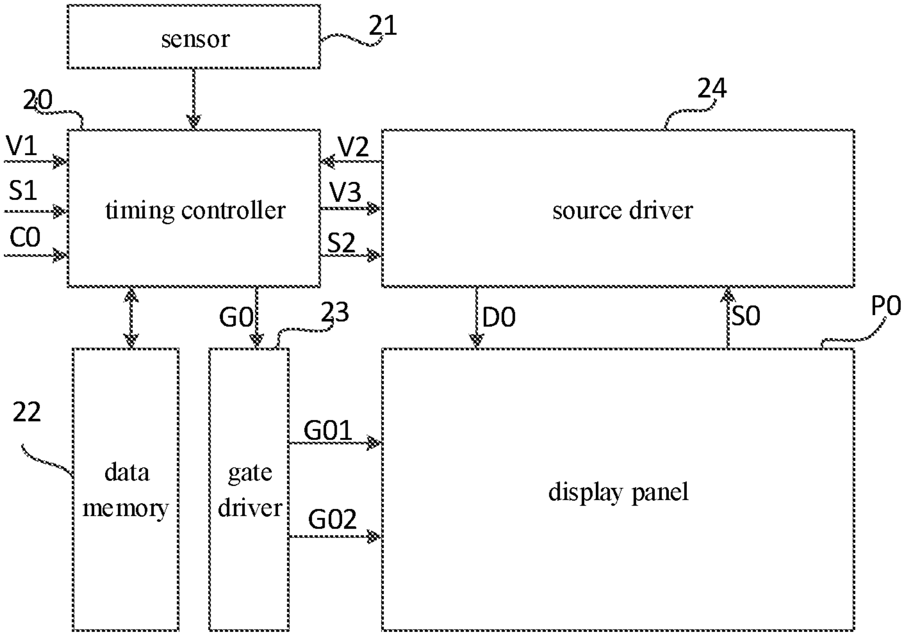
FIG. 4 is a structural diagram of a display device according to at least one embodiment of the present disclosure.

In at least one embodiment of the present disclosure, as shown in FIG. 4, the display device may include a timing controller 20, a sensor 21, a data memory 22, a gate driver 23, a source driver 24, and a display panel P0;

The source driver 24 is electrically connected to the display panel P0 through the data line D0 and the sensing line S0 respectively (in specific implementation, the number of the data line D0 and the number of the sensing line S0 may be more than one);

The sensor 21 is used to detect the initial temperature of the display panel P0 before the display panel displays the image, and is also used to detect the real-time temperature of the display panel P0 when the display panel displays the image, and provide the initial temperature of the display panel P0 and the real-time temperature to the timing controller 20;

The timing controller 20 receives the original data voltage V1, the timing control signal S1 and the user control signal C0 inputted from the outside, and receives the initial temperature and the real-time temperature detected by the sensor 21, and simultaneously receives the sensing voltage V2 from the sensing line S0 provided by the source driver 24; the timing controller 20 can sense the characteristic value of the pixel circuit according to the sensing voltage V2 (the characteristic value of the pixel circuit can include the characteristic value of the driving transistor and the characteristic value of the light emitting element), and, a compensation data voltage V3 is generated according to the characteristic value and the original data voltage V1, and the compensation data voltage V3 is transmitted to the source driver 24, so the source driver 24 provides the compensation data voltage V3 to the corresponding pixel circuit included in the display panel P0 through the data line D0, to compensate the aging of the driving transistor and the light emitting element;

The sensed characteristic value of the pixel circuit can be stored in the data memory 22;

The gate driver 23 respectively provides a first scan control signal G01 and a second scan control signal G02 to the display panel P0 (the number of G01 and the number of G02 may be more than one);

The timing controller 20 provides a gate control signal G0 to the gate driver 23 to control the operation of the gate driver 23 to work; and the timing controller 20 provides a source driving signal S2 to the source driver 24 to control the operation of the source driver 24.

In at least one embodiment of the present disclosure, the sensor 21 may also be used to detect the temperature of the circuit board and the ambient temperature, wherein the timing controller, the gate driver, the source driver, the sensor and the data storage may be arranged on the circuit board, but are not limited thereto.

Figure 5:
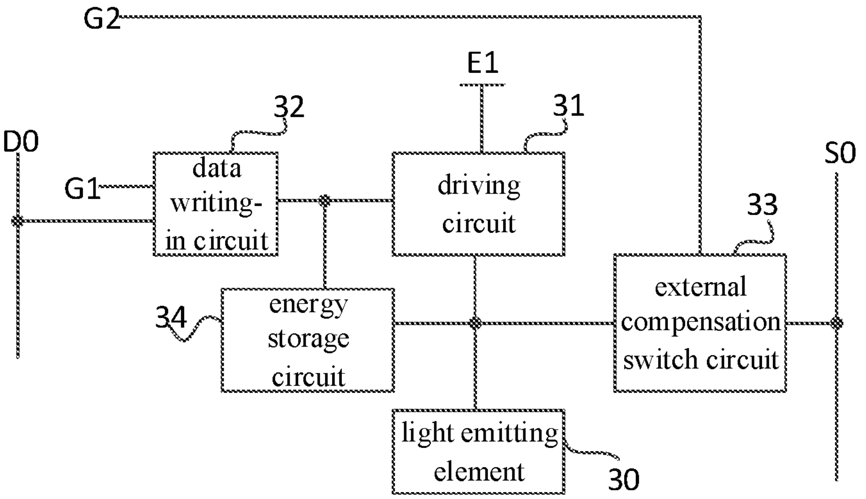
FIG. 5 is a structural diagram of a pixel circuit in a display device according to an embodiment of the present disclosure.

Optionally, as shown in FIG. 5, the pixel circuit may include a driving circuit 31, a light emitting element 30, a data writing-in circuit 32, an external compensation switch circuit 33 and an energy storage circuit 34;

The data writing-in circuit 32 is electrically connected to a first scanning control line G1, a data line D0 and a control terminal of the driving circuit 31 respectively, and is configured to control to connect or disconnect the data line D0 and the control terminal of the driving circuit 31 under the control of the first scanning control signal provided by the first scanning control line G1.

The external compensation switch circuit 33 is electrically connected to the second scan control line G2, a first terminal of the driving circuit 31 and a sensing line S0, respectively, and is configured to control to connect or disconnect the first terminal of the driving circuit 31 and the sensing line S0 under the control of the second scan control signal provided by the second scan control line G2;

The first terminal of the driving circuit 31 is electrically connected to the light emitting element 30; the second terminal of the driving circuit 31 is electrically connected to the power supply voltage line E1; the driving circuit 31 is configured to control to generate a driving current for driving the light emitting element 30 under the control of the potential of the control terminal of the driving circuit 31, and;

The first terminal of the energy storage circuit 34 is electrically connected to the control terminal of the driving circuit 31, and the second terminal of the energy storage circuit 34 is electrically connected to the first terminal of the driving circuit 31.

Figure 6:
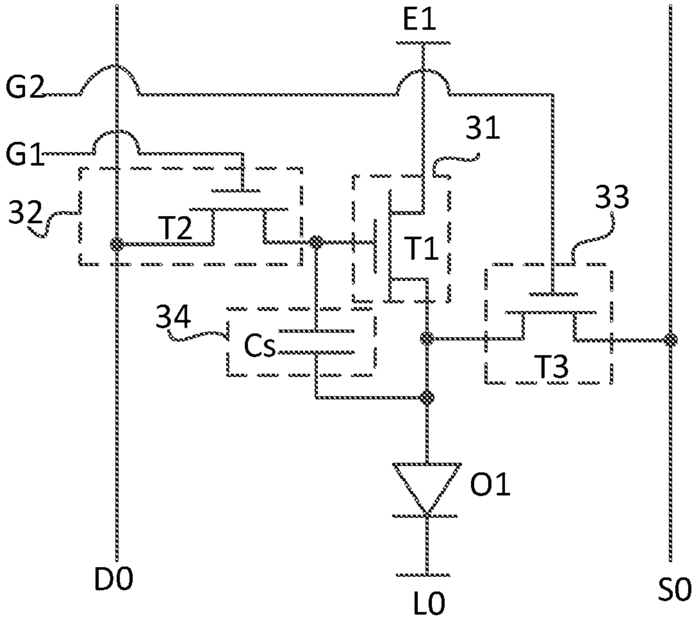
FIG. 6 is a circuit diagram of the pixel circuit according to at least one embodiment of the present disclosure.

As shown in FIG. 6, based on at least one embodiment of the pixel circuit shown in FIG. 5, the driving circuit 31 may include a driving transistor T1, and the data writing-in circuit 32 may include a data writing-in transistor T2; the external compensation switch circuit 33 may include a switch transistor T3; the energy storage circuit 34 may include a storage capacitor Cs; the light emitting element is an organic light emitting diode O1;

The drain electrode of T1 is electrically connected to the power supply voltage terminal E1, the source electrode of T1 is electrically connected to the anode of O1, and the cathode of O1 is electrically connected to the low voltage terminal L0;

The gate electrode of T2 is electrically connected to the first scan control line G1, the drain electrode of T2 is electrically connected to the data line D0, and the source electrode of T2 is electrically connected to the gate electrode of T1;

The gate electrode of T3 is electrically connected to the second scan control line G2, the drain electrode of T3 is electrically connected to the source electrode of T1, and the source electrode of T3 is electrically connected to the sensing line S0;

The sensing line S0 has parasitic capacitance.

In at least one embodiment of the pixel circuit shown in FIG. 6, T1, T2 and T3 are all n-type thin film transistors, but not limited thereto.

Figure 7:
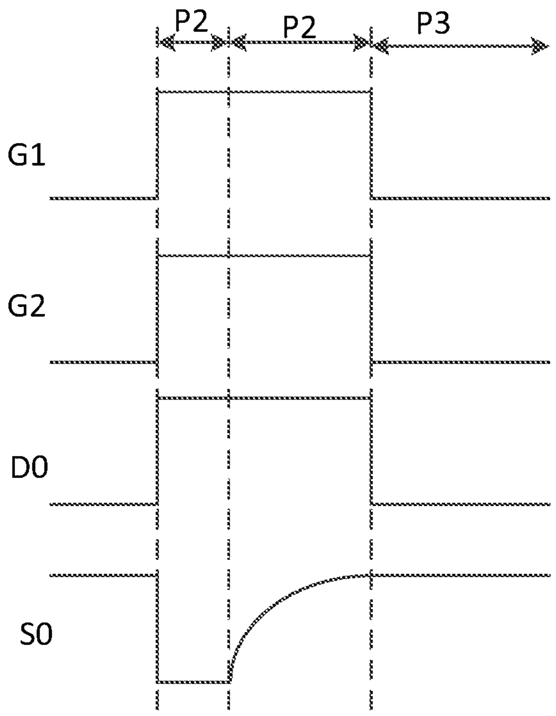
FIG. 7 is a timing diagram of the pixel circuit shown in FIG. 6.

For example, when at least one embodiment of the pixel circuit shown in FIG. 6 is in operation, When detecting the threshold voltage Vth of the driving transistor T1, as shown in FIG. 7, in the first time period P1, G1 provides a high voltage signal, G2 provides a high voltage signal, D0 provides a data voltage, S0 provides a reset voltage, and T2 and T3 are turned on, to write the data voltage into the gate electrode of T1, and write the reset voltage into the source electrode of T1; in the second time period P2, G1 provides a high voltage signal, G2 provides a high voltage signal, D0 provides a data voltage, both T2 and T3 are turned on; in the third time period P3, G1 provides a low voltage signal, G2 provides a low voltage signal, both T2 and T3 are turned off, and the potential of S0 is detected, and Vth can be obtained according to the potential of S0.

Figure 8:
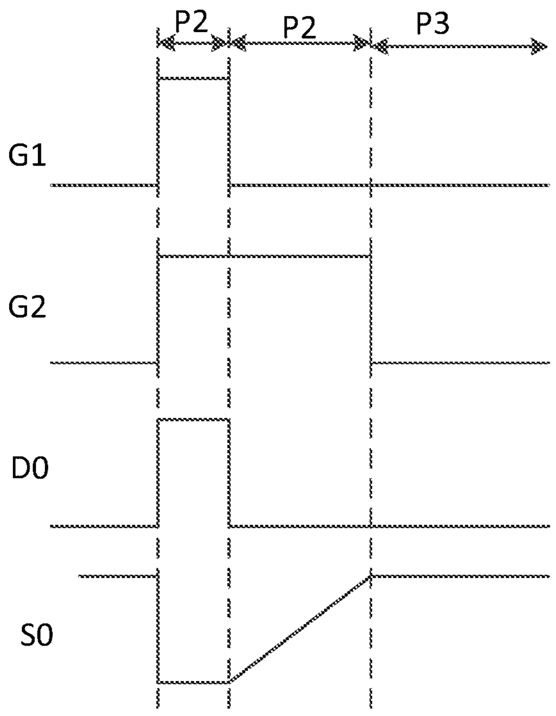
FIG. 8 is another timing diagram of the pixel circuit shown in FIG. 6.

When detecting the mobility K of the driving transistor T1, as shown in FIG. 8, in the first time period P1, G1 provides a high voltage signal, G2 provides a high voltage signal, D0 provides a data voltage, S0 provides a reset voltage, and T2 and T3 are turned on, to write the data voltage into the gate electrode of T1, and write the reset voltage into the source electrode of T1; in the second time period P2, G1 provides a low voltage signal, G2 provides a high voltage signal, T2 is turned off, and T3 is turned on; in the third time period P3, both G1 and G2 provide low voltage signals, both T2 and T3 are turned off, and the potential of S0 is detected, and the mobility K of T1 can be obtained according to the potential of S0.

Figure 9:
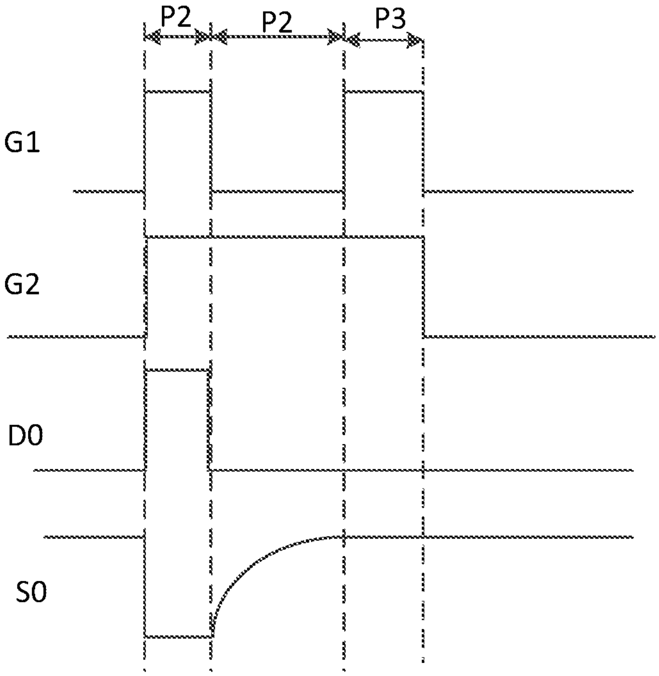
FIG. 9 is another timing diagram of the pixel circuit shown in FIG. 6.

When detecting the turn-on voltage of the organic light emitting diode O1, as shown in FIG. 9, in the first time period P1, G1 provides a high voltage signal, G2 provides a high voltage signal, D0 provides a data voltage, S0 provides a reset voltage, T2 and T3 are turned on to write the data voltage into the gate electrode of T1 and write the reset voltage into the source electrode of T1; in the second time period P2, G1 provides a low voltage signal, G2 provides a high voltage signal, T2 is turned off, T3 is turned on; in the third time period P3, G1 provides a high voltage signal, G2 provides a high voltage signal, T2 and T3 are turned on, the potential of S0 is detected, and the mobility K of T1 can be obtained according to the potential of S0.

The display device according to the embodiment of the present disclosure includes a display panel, a gate driver, a source driver and a timing controller, the display panel includes pixel circuits in a plurality of rows and a plurality of columns; the timing controller is respectively electrically connected to the gate driver and the source driver;

The display panel is configured to be controlled to maintain a standstill state in a standstill phase after the timing controller receives a power-off sensing instruction;

The timing controller is used to sense the characteristic values of each row of pixel circuits included in the display panel in a time division manner by controlling the gate driver and the source driver after the standstill phase ends, and control the gate driver and the source driver to display a black picture on the display panel in a black insertion time period set between the time periods for sensing the characteristic values of different rows of the pixel circuits.

When the display device according to the embodiment of the present disclosure is in operation, after the timing controller detects the power-off sensing instruction, in the standstill phase, the display panel is controlled to be stand still, so as to ensure that the temperature of the display panel can be lowered without affecting the sensing result of the characteristic value of the pixel circuit; after the standstill phase ends, the timing controller senses the characteristic value of each row of pixel circuits included in the display panel in a time division manner; controls to display a black picture on the display panel in the black insertion time period set between the time periods for sensing the characteristic values of different rows of pixel circuits, to ensure that there is no residual charge inside the display panel, the next sensing is not affected, and the phenomenon that the characteristic value of the pixel circuit is inaccurately sensed is avoided, the quality of the display image is improved.

In a specific implementation, the standstill phase includes a driving standstill phase; after the timing controller detects the power-off sensing instruction, the power-off sensing period includes a driving standstill phase and a driving sensing phase that are set in sequence; the driving sensing phase includes N driving sensing time periods set in sequence, and a black insertion time period is set between two adjacent driving sensing time periods; N is the number of rows of pixel circuits included in the display panel; n and N are positive integers, and n is less than or equal to N; the display panel is configured to be stand still during the driving standstill phase;

The timing controller is further configured to sense the characteristic values of the driving transistors in the nth row of pixel circuits by controlling the gate driver and the source driver during the nth driving sensing time period, and also control the gate driver and the source driver to display a black picture on the display panel in the driving black insertion time period.

In at least one embodiment of the present disclosure, after detecting the power-off sensing instruction of the display device, the characteristic values of the driving transistors in each row of pixel circuits included in the display panel can be sensed, so that when the display device is turned on next time, the timing controller can compensate the data voltage provided to each row of pixel circuits according to the characteristic value, so as to improve the quality of the display image.

In at least one embodiment of the present disclosure, the standstill phase includes a light emitting standstill phase; the power-off sensing period further includes a light emitting standstill phase and a light emitting sensing phase sequentially arranged after the driving sensing phase; the light emitting sensing phase includes N light emitting sensing time periods set in sequence, and a light emitting black insertion time period is set between two adjacent light emitting sensing time periods; the display panel is configured to be stand still in the light emitting standstill phase;

The timing controller is further configured to sense the characteristic value of the light emitting element in the nth row of pixel circuits by controlling the gate driver and the source driver during the nth light emitting sensing period, control the gate driver and the source driver so that a black picture is displayed on the display panel in the light emitting black insertion time period.

In at least one embodiment of the present disclosure, a light emitting standstill phase and a light emitting sensing phase are further provided after the driving sensing phase. In the light emitting standstill phase, the display panel is controlled to stand still to ensure the stable characteristics of the light emitting element. The characteristic value of the light emitting element in each row of pixel circuits included in the display panel is sensed, so that when the display device is turned on next time, the timing controller can compensate the data voltage provided to each row of pixel circuits according to the characteristic value, and improve the quality of the display image.

In a specific implementation, the timing controller is further configured to, when the display device is turned on next time, compensate the data voltages provided to each row of pixel circuits according to the characteristic values of the driving transistors in each row of pixel circuits sensed in each driving sensing time period, and, the characteristic values of the light emitting elements in each row of pixel circuits sensed in the light emitting sensing time period, so as to improve the display quality of the display device when the display device is turned on next time.

Optionally, the timing controller is configured to display a black picture on the display panel by controlling the gate driver and the source driver in the driving standstill phase and the light emitting standstill phase; or, The display device further includes a power supply module, the power supply module is configured to stop supplying power to the display panel in the driving standstill phase and the light emitting standstill phase, and resume supplying power to the display panel after the driving standstill phase ends.

Optionally, the time period during which the display panel displays an image includes at least one display sensing phase, and the timing controller is further configured to control the gate driver and the source driver in the display sensing phase, to sense the characteristic value of the pixel circuit, and compensate the data voltage supplied to the pixel circuit according to the characteristic value; an interval period being set between adjacent display sensing phases; and/or, The timing controller is further configured to, when the display panel displays an image, and, when the absolute value of the difference between the real-time temperature of the display panel and the initial temperature of the display panel is greater than the temperature difference threshold, control the gate driver and the source driver to sense the characteristic value of the pixel circuit and compensate the data voltage provided to the pixel circuit according to the characteristic value; the temperature difference threshold is a positive value;

The initial temperature of the display panel is the temperature of the display panel before the display panel displays an image.

During operation of the display device according to at least one embodiment of the present disclosure, when the display panel displays an image, and when the characteristics of the driving transistors in the pixel circuit and the characteristics of the light emitting elements in the pixel circuit are stable, the real-time sensing is not required. The characteristic value of the pixel circuit can be sensed once every time the normal display time of the display panel reaches the interval time (the duration of the interval time period is the interval time). When the display panel displays an image, in the display sensing phase, the timing controller senses the characteristic value of the pixel circuit every interval time by controlling the gate driver and the source driver, the data voltage supplied to the pixel circuit is compensated according to the characteristic value, so that power consumption can be reduced.

In a display device, the temperature has a direct impact on the characteristics of the driving transistors and light emitting elements in the pixel circuit. Therefore, when sensing the characteristic value of the pixel circuit, the temperature factor needs to be considered. Based on this, when the display device according to at least one embodiment of the present disclosure is in operation, the initial temperature of the display panel is detected before the display panel starts to display the image normally, and then the temperature of the display panel is detected in real time when the display panel displays the image. When the absolute value of the difference between the real-time temperature and the initial temperature is greater than the temperature difference threshold, the timing controller controls the gate driver and the source driver to sense the characteristic value of the pixel circuit, and compensate the data voltage provided to the pixel circuit according to the characteristic value, so that the impact of the temperature of the display panel on the display can be improved, and the quality of the display image can be improved.

Optionally, the display device according to at least one embodiment of the present disclosure further includes a data memory, where the data memory is configured to store the characteristic value of the pixel circuit.

Figure 10:
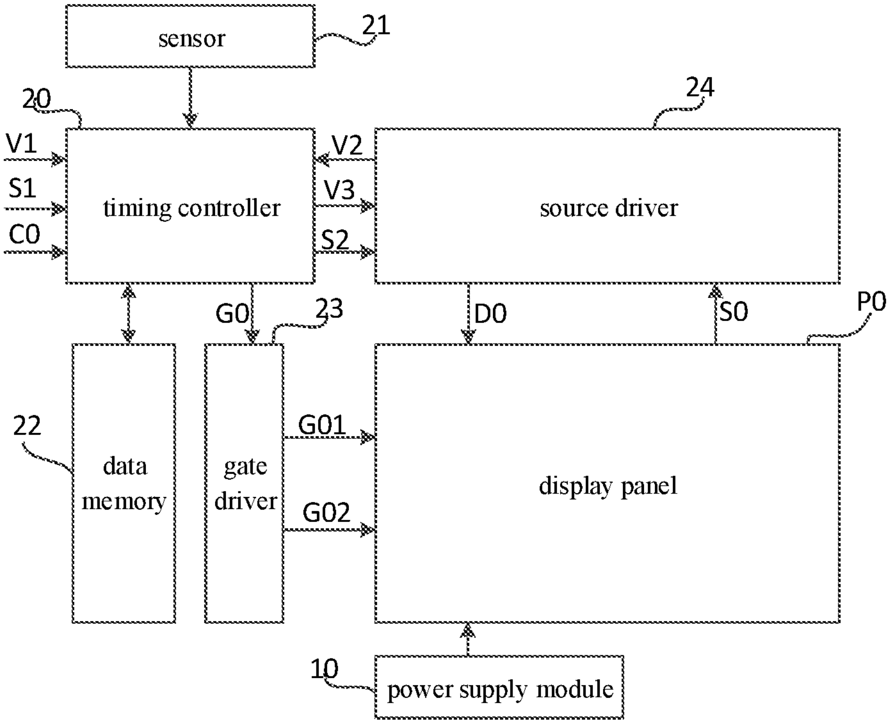
FIG. 10 is a structural diagram of a display device according to at least one embodiment of the present disclosure.

In at least one embodiment of the present disclosure, the display device further includes a sensor;

The sensor is used to detect the initial temperature of the display panel before the display panel displays an image, and is used to detect the real-time temperature of the display panel when the display panel displays an image. As shown in FIG. 10, based on at least one embodiment of the display device shown in FIG. 4, the display device may further include a power supply module 10, and the power supply module 10 is electrically connected to the display panel P0 and is configured to control to stop supplying power to the display panel P9 in the driving standstill phase and the light emitting standstill phase.

In at least one embodiment of the present disclosure, the display panel may further include a plurality of rows of first scan control lines, a plurality of rows of second scan control lines, a plurality of columns of data lines, and a plurality of columns of sensing lines;

One row of pixel circuits are respectively electrically connected to the first scan control line of the corresponding row and the second scan control line of the corresponding row, and one column of pixel circuits are electrically connected to the data line of the corresponding column and the sensing line of the corresponding column respectively;

The gate driver is electrically connected to the first scan control lines of the plurality of rows and the second scan control lines of the plurality of rows, and is configured to provide a corresponding first scan control signal for the first scan control line of each row, and provide a corresponding second scan control signal for the second scan control line of each row;

The source driver is electrically connected to data lines of the plurality of columns and the sensing lines the plurality of columns, respectively, is configured to provide a data voltage to the data lines of each column, and receive the sensing voltage from the sensing line of each column.

In a specific implementation, the display panel may include first scan control lines of a plurality of rows, second scan control lines of a plurality of rows, data lines of a plurality of columns and sensing lines of a plurality of columns, and the plurality of pixel circuits located in the same row are respectively connected to the scan control line of the same row and the second scan control line of the same row, a plurality of circuits located in the same column are electrically connected to the data line of the same column and the sensing line of the same column respectively, and the gate driver provides a first scan control signal and a second scan control signal to the first scan control line and the second scan control line respectively, and the source driver is configured to provide the data voltage for the data line, receive the sensing voltage from the sensing line, and provide the sensing voltage to the timing controller.

Optionally, the pixel circuit includes a driving circuit, a light emitting element, a data writing-in circuit, an external compensation switch circuit and an energy storage circuit;

The data writing circuit is electrically connected to the first scan control line of the corresponding row, the data line of the corresponding column and the driving circuit, and is configured to control to connect or disconnect the data line and the control terminal of the driving circuit under the control of the first scan control signal provided by the first scan control line of the corresponding row;

The external compensation switch circuit is electrically connected to the second scan control line of the corresponding row, the first terminal of the driving circuit and the sensing line of the corresponding column, respectively, and is configured to control to connect or disconnect the first terminal of the driving circuit and the sensing line of the corresponding column under the control of the second scan control signal provided by the second scan control line of the corresponding row; the first terminal of the driving circuit is electrically connected to the light emitting element;

The second terminal of the drive circuit is electrically connected to the power supply voltage terminal, and the driving circuit is configured to generate a driving current for driving the light emitting element under the control of the potential of the control terminal of the driving circuit;

The first terminal of the energy storage circuit is electrically connected to the control terminal of the driving circuit, the second terminal of the energy storage circuit is electrically connected to the first terminal of the driving circuit, and the energy storage circuit is used for storing electrical energy.

The display device provided by the embodiment of the present disclosure may be any product or component with a display function, such as a mobile phone, a tablet computer, a television, a monitor, a notebook computer, a digital photo frame, and a navigator.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A compensation control method, applied to a display device, wherein the display device includes a display panel, a gate driver, a source driver and a timing controller, the display panel includes a plurality of pixel circuits, and the compensation control method includes: after the timing controller detects a power-off sensing instruction, in a standstill phase, controlling the display panel to stand still;

after the standstill phase ends, sensing, by the timing controller, characteristic values of each row of the pixel circuits in the display panel in a time division manner by controlling the gate driver and the source driver;

setting a black insertion time period between time periods for sensing characteristic values of different rows of pixel circuits, during the black insertion time period, controlling, by the timing controller, the gate driver and the source driver, to display a black picture on the display panel.

2. The compensation control method according to claim 1, wherein the pixel circuit comprises a driving transistor; the standstill phase includes a driving standstill phase; after the timing controller detects the power-off sensing instruction, a power-off sensing time period includes the driving standstill phase and a driving sensing phase set in sequence; the driving sensing phase includes N driving sensing time periods set in sequence, and a driving black insertion time period is set between two adjacent driving sensing time periods; N is a number of rows of pixel circuits included in the display panel; n and N are positive integers, and n is less than or equal to N; the compensation control method includes a first power-off sensing step;

the first power-off sensing step includes:

in the driving standstill phase, controlling the display panel to stand still;

in the nth driving sensing time period, sensing, by the timing controller, characteristic values of driving transistors in the nth row of pixel circuits by controlling the gate driver and the source driver;

in the driving black insertion time period, controlling, by the timing controller, the gate driver and the source driver to display the black picture on the display panel.

3. The compensation control method according to claim 2, wherein a time period during which the display panel displays an image includes at least one display sensing phase, and the compensation control method further includes: in the display sensing phase, sensing, by the timing controller, the characteristic value of the pixel circuit by controlling the gate driver and the source driver and compensating the data voltage supplied to the pixel circuit according to the characteristic value; setting an interval time period between adjacent display sensing phases; and/or, the compensation control method further includes: before the display panel displays an image, detecting an initial temperature of the display panel; and detecting a real-time temperature of the display panel when the display panel displays an image, when an absolute value of a difference between the real-time temperature and the initial temperature is greater than a temperature difference threshold, sensing, by the timing controller, the characteristic value of the pixel circuit by controlling the gate driver and the source driver, and compensating the data voltage provided to the pixel circuit according to the characteristic value;

the temperature difference threshold is a positive value.

4. The compensation control method according to claim 2, wherein the pixel circuit comprises a light emitting element; the standstill phase further comprises a light emitting standstill phase; the power-off sensing time period further includes a light emitting standstill phase and a light emitting sensing phase sequentially arranged after the driving sensing phase; the light emitting sensing phase includes N light emitting sensing time periods sequentially arranged, a light emitting black insertion time period is set between two adjacent light emitting sensing time periods; the compensation control method further includes a second power-off sensing step;

the second power-off sensing step includes:

in the light emitting standstill phase, controlling the display panel to stand still;

in the nth light emitting sensing period, sensing, by the timing controller, characteristic values of light emitting elements in the nth row of pixel circuits by controlling the gate driver and the source driver;

in the light emitting black insertion time period, controlling, by the timing controller, the gate driver and the source driver to display the black picture on the display panel.

5. The compensation control method according to claim 4, further comprising a power-on compensation step;

wherein the power-on compensation step includes: when the display device is powered on next time, compensating, by the timing controller, data voltages provided to each row of pixel circuits according to the characteristic values of the driving transistors in each row of pixel circuits sensed in each driving sensing time period, and the characteristic values of the light emitting elements in each row of pixel circuits sensed in the light emitting sensing time period.

6. The compensation control method according to claim 5, wherein a time period during which the display panel displays an image includes at least one display sensing phase, and the compensation control method further includes: in the display sensing phase, sensing, by the timing controller, the characteristic value of the pixel circuit by controlling the gate driver and the source driver and compensating the data voltage supplied to the pixel circuit according to the characteristic value; setting an interval time period between adjacent display sensing phases; and/or, the compensation control method further includes: before the display panel displays an image, detecting an initial temperature of the display panel; and detecting a real-time temperature of the display panel when the display panel displays an image, when an absolute value of a difference between the real-time temperature and the initial temperature is greater than a temperature difference threshold, sensing, by the timing controller, the characteristic value of the pixel circuit by controlling the gate driver and the source driver, and compensating the data voltage provided to the pixel circuit according to the characteristic value;

the temperature difference threshold is a positive value.

7. The compensation control method according to 4, wherein a time period during which the display panel displays an image includes at least one display sensing phase, and the compensation control method further includes: in the display sensing phase, sensing, by the timing controller, the characteristic value of the pixel circuit by controlling the gate driver and the source driver and compensating the data voltage supplied to the pixel circuit according to the characteristic value; setting an interval time period between adjacent display sensing phases; and/or, the compensation control method further includes: before the display panel displays an image, detecting an initial temperature of the display panel; and detecting a real-time temperature of the display panel when the display panel displays an image, when an absolute value of a difference between the real-time temperature and the initial temperature is greater than a temperature difference threshold, sensing, by the timing controller, the characteristic value of the pixel circuit by controlling the gate driver and the source driver, and compensating the data voltage provided to the pixel circuit according to the characteristic value;

the temperature difference threshold is a positive value.

8. The compensation control method according to claim 1, wherein the step of controlling the display panel to stand still comprises:

controlling, by the timing controller, the gate driver and the source driver to display the black picture on the display panel; or, controlling, by the power supply module included in the display device, the display panel to be powered off.

9. The compensation control method according to claim 1, wherein a time period during which the display panel displays an image includes at least one display sensing phase, and the compensation control method further includes: in the display sensing phase, sensing, by the timing controller, the characteristic value of the pixel circuit by controlling the gate driver and the source driver and compensating the data voltage supplied to the pixel circuit according to the characteristic value; setting an interval time period between adjacent display sensing phases; and/or, the compensation control method further includes: before the display panel displays an image, detecting an initial temperature of the display panel; and detecting a real-time temperature of the display panel when the display panel displays an image, when an absolute value of a difference between the real-time temperature and the initial temperature is greater than a temperature difference threshold, sensing, by the timing controller, the characteristic value of the pixel circuit by controlling the gate driver and the source driver, and compensating the data voltage provided to the pixel circuit according to the characteristic value;

the temperature difference threshold is a positive value.

10. The compensation control method according to claim 9, wherein the pixel circuit comprises a driving transistor and a light emitting element; the characteristic value of the pixel circuit includes a characteristic value of the driving transistor and a characteristic value of the light emitting element;

the step of sensing, by the timing controller, the characteristic value of the pixel circuit by controlling the gate driver and the source driver includes:

sensing, by the timing controller, the characteristic value of the driving transistor in the pixel circuit by controlling the gate driver and the source driver;

after sensing the characteristic value of the driving transistor, sensing, by the timing controller, the characteristic value of the light emitting element in the pixel circuit by controlling the gate driver and the source driver.

11. A display device comprising a display panel, a gate driver, a source driver and a timing controller, wherein the display panel includes a plurality of rows and a plurality of columns of pixel circuits; the timing controller is respectively electrically connected to the gate driver and the source driver;

the display panel is configured to be controlled to maintain a standstill state in a standstill phase after the timing controller receives and detects a power-off sensing instruction;

the timing controller is configured to sense characteristic values of each row of pixel circuits included in the display panel in a time division manner by controlling the gate driver and the source driver after the standstill phase ends, and control the gate driver and the source driver to display a black picture on the display panel in a black insertion time period set between time periods for sensing characteristic values of different rows of the pixel circuits.

12. The display device according to claim 11, wherein the standstill phase includes a driving standstill phase; after the timing controller detects the power-off sensing instruction, a power-off sensing time period includes a driving standstill phase and a driving sensing phase that are set in sequence; the driving sensing phase includes N driving sensing time periods set in sequence, and a driving black insertion time period is set between two adjacent driving sensing time periods; N is a number of rows of pixel circuits included in the display panel; n and N are positive integers, and n is less than or equal to N; the display panel is configured to be stand still in the driving standstill phase;

the timing controller is further configured to sense characteristic values of driving transistors in an nth row of pixel circuits by controlling the gate driver and the source driver in an nth driving sensing time period, and also control the gate driver and the source driver to display the black picture on the display panel in the driving black insertion time period.

13. The display device according to claim 12, wherein the standstill phase includes a light emitting standstill phase; the power-off sensing time period further includes a light emitting standstill phase and a light emitting sensing phase sequentially arranged after the driving sensing phase; the light emitting sensing phase includes N light emitting sensing time periods set in sequence, and a light emitting black insertion time period is set between two adjacent light emitting sensing time periods; the display panel is configured to be stand still in the light emitting standstill phase;

the timing controller is further configured to sense characteristic values of light emitting elements in the nth row of pixel circuits by controlling the gate driver and the source driver in an nth light emitting sensing time period, control the gate driver and the source driver to display the black picture on the display panel in the light emitting black insertion time period.

14. The display device according to claim 11, wherein the timing controller is further configured to, when the display device is turned on next time, compensate data voltages provided to each row of pixel circuits according to the characteristic values of the driving transistors in each row of pixel circuits sensed in each driving sensing time period, and, the characteristic values of the light emitting elements in each row of pixel circuits sensed in the light emitting sensing time period.

15. The display device according to claim 13, wherein the timing controller is configured to control the gate driver and the source driver to display the black picture on the display panel in the driving standstill phase and the light emitting standstill phase; or, the display device further includes a power supply module, the power supply module is configured to stop supplying power to the display panel in the driving standstill phase and the light emitting standstill phase, and resume supplying power to the display panel after the driving standstill phase ends and the light emitting standstill phase ends.

16. The display device according to claim 11, wherein a time period during which the display panel displays an image includes at least one display sensing phase, and the timing controller is further configured to sense the characteristic value of the pixel circuit by controlling the gate driver and the source driver in the display sensing phase, and compensate the data voltage supplied to the pixel circuit according to the characteristic value; an interval period is set between adjacent display sensing phases; and/or, the timing controller is further configured to, when the display panel displays an image, and, when an absolute value of a difference between a real-time temperature of the display panel and an initial temperature of the display panel is greater than a temperature difference threshold, sense the characteristic value of the pixel circuit by controlling the gate driver and the source driver, and compensate the data voltage provided to the pixel circuit according to the characteristic value; the temperature difference threshold is a positive value;

the initial temperature of the display panel is a temperature of the display panel before the display panel displays an image.

17. The display device according to claim 16, wherein the display device further comprises a data memory for storing the characteristic value of the pixel circuit.

18. The display device according to claim 16, further comprising a sensor;

wherein the sensor is configured to detect the initial temperature of the display panel before the display panel displays an image, and detect the real-time temperature of the display panel when the display panel displays an image.

19. The display device according to claim 11, wherein the display panel further includes first scan control lines of a plurality of rows, second scan control lines of a plurality of rows, data lines of a plurality of columns, and sensing lines of a plurality of columns;

one row of pixel circuits are respectively electrically connected to a first scan control line of a corresponding row and a second scan control line of the corresponding row, and one column of pixel circuits are electrically connected to a data line of a corresponding column and a sensing line of the corresponding column respectively;

the gate driver is electrically connected to the first scan control lines of the plurality of rows and the second scan control lines of the plurality of rows, and is configured to provide a corresponding first scan control signal for the first scan control line of each row, and provide a corresponding second scan control signal for the second scan control line of each row;

the source driver is electrically connected to data lines of the plurality of columns and the sensing lines the plurality of columns, respectively, is configured to provide a data voltage to the data lines of each column, and receive a sensing voltage from the sensing line of each column.

20. The display device according to claim 19, wherein the pixel circuit includes a driving circuit, a light emitting element, a data writing-in circuit, an external compensation switch circuit and an energy storage circuit;

the data writing-in circuit is electrically connected to the first scan control line of the corresponding row, the data line of the corresponding column and the driving circuit, and is configured to control to connect or disconnect the data line and a control terminal of the driving circuit under the control of the first scan control signal provided by the first scan control line of the corresponding row;

the external compensation switch circuit is electrically connected to the second scan control line of the corresponding row, a first terminal of the driving circuit and the sensing line of the corresponding column, respectively, and is configured to control to connect or disconnect the first terminal of the driving circuit and the sensing line of the corresponding column under the control of the second scan control signal provided by the second scan control line of the corresponding row; the first terminal of the driving circuit is electrically connected to the light emitting element;

the second terminal of the driving circuit is electrically connected to a power supply voltage terminal, and the driving circuit is configured to generate a driving current for driving the light emitting element under the control of a potential of the control terminal of the driving circuit;

a first terminal of the energy storage circuit is electrically connected to the control terminal of the driving circuit, a second terminal of the energy storage circuit is electrically connected to the first terminal of the driving circuit, and the energy storage circuit is used for storing electrical energy.

* * * * *